H. M. LAMBERT.
TIRE TREAD.
APPLICATION FILED MAY 18, 1918.
1,309,440.
Patented July 8, 1919.
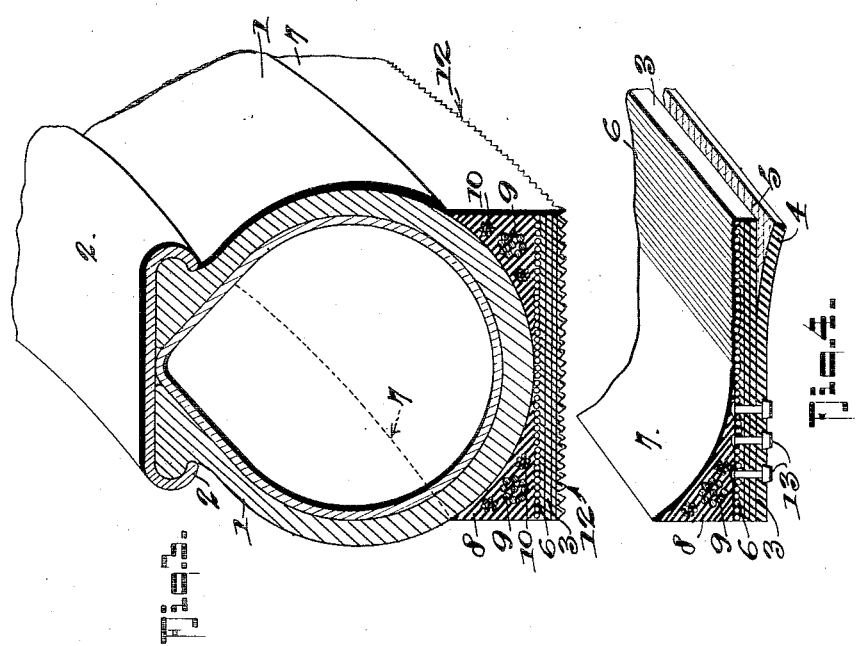
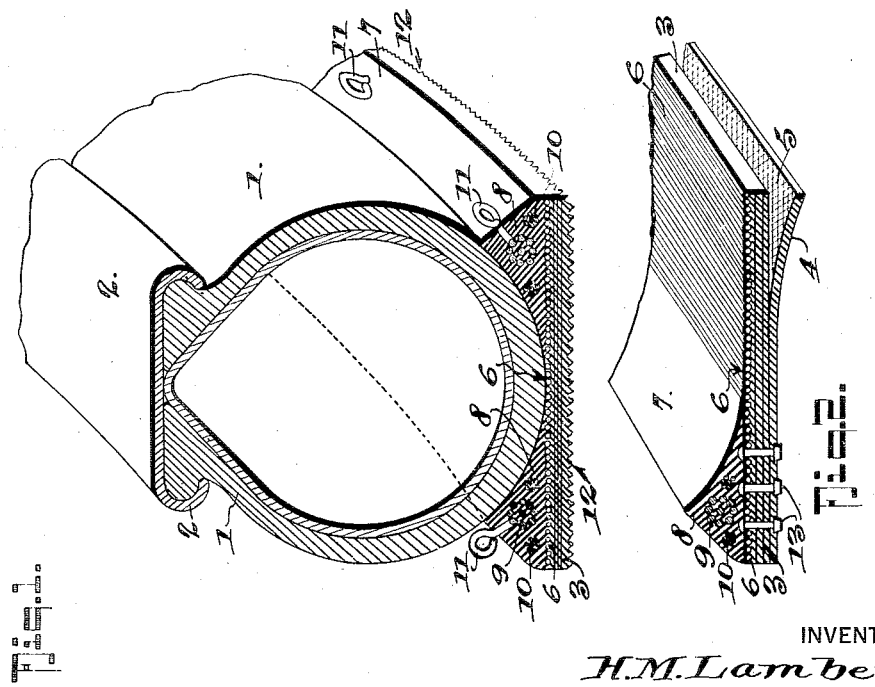
INVENTOR
H. M. Lambert.
BY
Fred J. Dieterich
ATTORNEYS

UNITED STATES PATENT OFFICE.

HENRY M. LAMBERT, OF PORTLAND, OREGON, ASSIGNOR TO LAMBERT TIRE AND RUBBER COMPANY, OF PORTLAND, OREGON, A CORPORATION OF ARIZONA.

TIRE-TREAD.

1,309,440.  Specification of Letters Patent.  Patented July 8, 1919.

Application filed May 18, 1918. Serial No. 235,303.

*To all whom it may concern:*

Be it known that I, HENRY M. LAMBERT, residing at Portland, in the county of Multnomah and State of Oregon, have invented certain new and useful Improvements in Tire-Treads, of which the following is a specification.

My invention is an improved tire shoe tread of the detachable type which has been especially designed for application to the standard makes of tires and which is so designed as to be retained on the tire by the pressure of the inflated shoe. The invention also provides a shoe tread of a non-stretching construction which will always maintain its circumferential length and thus always fit the tire on which it is applied.

Furthermore, the invention provides a wide tread for the tire whereby the wheel may pass over sand, mud or other soft yieldable surfaces without sinking into a groove or rut in the ground, thereby enabling the wheel to turn with less loss of energy and less road friction than heretofore.

In its more subordinate nature, the invention also includes those novel features of construction, combination and arrangement of parts, all of which will be first fully described, then be specifically pointed out in the appended claims and illustrated in the accompanying drawings, in which:

Figure 1 is a sectional perspective view of a portion of a tire with the invention applied.

Fig. 2 is a detail sectional perspective view of a portion of a modified form of tread.

Fig. 3 is a view similar to Fig. 1 of a further modification.

Fig. 4 is a view similar to Fig. 2 of a modified form of the structure shown in Fig. 3.

In the drawing, in which like letters and numerals of reference indicate like parts in all of the figures, 1 represents the ordinary tire and 2 the ordinary rim, both of which may be of the usual construction.

My invention consists of a flat tread surface strip 3 of annular form in side elevation and composed of woven fabric 5 embedded in rubber 4, there being one or more layers of fabric and rubber or other agglutinant, according to the desired thickness and tenacity of the fabric. The tread also includes embedded in the rubber a winding of circumferential cords 6 to render the tread strip 3 non-stretching in the direction of its length so that the diameter of the tread shoe will remain constant under conditions of use.

In order that the tread may be non-stretchable and hence enable the same to maintain its diameter when in use, the tread is built up over a form and the cords 6 as they are wound spirally on the form are placed under sufficient tension so as to stretch them to their approximate limit of elongation in order that substantially all of the stretch is taken out of the cords while they are wound. Before the structure is removed from the form the vulcanization is effected so that the agglutinant will bind the cord loops together to the remaining parts of the structure and thus hold the cords from shrinking back to their original unstretched condition. In other words, the tread strip 3 is preferably composed of a stretchless belting constructed as disclosed in my application for patent filed July 28, 1914, Serial No. 853,617, allowed September 18, 1917.

7 designates the side filler strips or flanges which are of annular form and have concave surfaces to fit the tire shoe 1, the flange rings 7 consisting of rubber or other agglutinant 8 in which are embedded main and supplemental cables 9 and 10 of stranded cord or rope in preference, although fine steel wire may be used.

The tread face of the shoe tread is preferably roughened as at 12 or provided with rivets 13 to act as non-skid members or any other suitable non-skid surface formation may be imparted to the tread face of the strip 3.

If desired, eyelets 11 may be formed to project from the flanges 7, by means of which the tread may be tied or chained to the tire 1 and rim 2, in the usual manner, although by my construction of non-stretching tread, the use of chains or tie strips will, I believe, be found unnecessary as by keeping the tire 1 properly inflated, all danger of the tread coming off the tire by side stresses or lateral pressure of the vehicle is eliminated.

I am aware that heretofore attempts have been made to provide tread shoes for pneumatic tires in which the tread has been held on by the inflation of the tube, but in all cases which have come to my attention it has either been necessary to encircle the tire through a very large part of its transverse circumference in order to retain the outer tread or provide positive tying devices for holding the tread in place. In those cases in which a flat tread has been employed, the difficulty experienced has been due to the elongation or stretching of the tread member. This I have positively eliminated by the provision of the circumferential or longitudinal cords 6 and the cables 9 and 10.

So far as this application contains matter in common with my application filed November 16, 1916, Serial No. 131,692, the present application is a continuation thereof.

From the foregoing description taken in connection with the accompanying drawing, the complete construction and advantages of my invention will be readily understood by those skilled in the art.

What I claim is:

1. A tire shoe tread comprising a flat annular belt-like body composed of layers of woven fabric and cord embedded in an agglutinant, the cord being stretched to approximately its maximum limit of elongation while being laid, and side filler flanges shaped to form a concave seat for the tire, the aforesaid structure being subjected to vulcanization to unite the same into an integral body.

2. A tire shoe tread comprising an annular flat body composed of layers of woven fabric and rubber and an annular layer of cord wound spirally in adjacent convolutions and stretched to its approximate limit of elongation while being laid, side filler flanges shaped to form a concave seat for the tire shoe and comprising annular cords embedded in an agglutinant, the aforesaid layers of woven fabric, rubber, cord and side filler flanges being vulcanized together to form an integral structure.

3. A tire shoe tread comprising an annular flat body composed of outer layers of woven fabric and rubber and an inner annular layer of cord, side filler flanges shaped to form a concaved seat for the tire and comprising annular cords embedded in an agglutinant, the aforesaid parts being vulcanized together, substantially as shown.

HENRY M. LAMBERT.